United States Patent Office 3,600,446
Patented Aug. 17, 1971

3,600,446
HYDROXYLATION OF AROMATIC COMPOUNDS
Stephen N. Massie, Palatine, Ill., assignor to Universal Oil Products Company, Des Plaines, Ill.
No Drawing. Filed Dec. 23, 1968, Ser. No. 786,391
Int. Cl. C07c 39/02, 43/20
U.S. Cl. 260—613D
9 Claims

ABSTRACT OF THE DISCLOSURE

Nuclear hydroxylation of aromatic compounds is effected by treating said aromatic compound with hydrogen peroxide in the presence of a co-reactant comprising hydrogen cyanide, a metal salt of hydrogen cyanide, or an organic nitrile at a temperature in the range of from about −10° to about 100° C.

---

This invention relates to a process for the nuclear hydroxylation of aromatic compounds. More particularly the invention is concerned with a process whereby one or more hydroxyl groups are introduced into the nucleus of an aromatic compound.

Hydroxylated aromatic compounds will find a wide variety of uses in the chemical field. For example, hydroquinone is an important chemical which is utilized for photographic developers, in dye intermediates, in medicine, as an antioxidant for fats and oils, as an inhibitor, in coating compounds, in paints and varnishes, as well as in motor fuels and oils. In addition, it is also used as an intermediate for preparing mono- and dibenzyl ethers of hydroquinone, the latter compounds being used as stabilizers, antioxidants, solvents, as well as being used in perfumes, plastics and pharmaceuticals. Likewise, the dihydroxylated benzenes compound, catechol, may be used as an antiseptic, in photography, dye-stuffs, as an antioxidant or light stabilizer. Furthermore, catechol is used as an intermediate for the preparation of the dimethyl ether of catechol which is used as an antioxidant and for the preparation of the mono-methyl ether of catechol which is guaiacol, said guaiacol being an important component of many medicinal preparations.

Likewise, phenol and the cresols are used in phenolic resins, as disinfectants, flotation agents, surfactants, scouring compounds, lube oil additives, photographic developers, intermediates in ink, paint, and varnish removers, etc. In addition, hydroxy-substituted aromatic carbohydrate derivatives may be used as intermediatees in detergents, water-soluble pharmaceuticals, explosives, gelling agents, surface coatings, resins and oxidative inhibitors.

It is therefore an object of this invention to provide a process for preparing hydroxylated aromatic compounds.

A further object of this invention is to provide a process for introducing hydrogen substituents into the nucleus of an aromatic compound utilizing certain reactive compositions of matter to effect the hydroxylation.

In one aspect, an embodiment of this invention is found in a process for the nuclear hydroxylation of an aromatic compound which comprises treating said aromatic compound with hydrogen peroxides at hydroxylation conditions in the presence of a co-reactant comprising hydrogen cyanide, a salt of hydrogen cyanide, or an organic nitrile compound, and recovering the resultant hydroxyzlated aromatic compound.

A specific embodiment of this invention rests in a process for nuclear hydroxylation of phenol which comprisees treating said phenol with hydrogen peroxide at a temperature in the range of −10° to about 100° C. and a pressure in the range of from about atmospheric to about 50 atmospheres in the presence of benzonitrile, and recovering the resultant hydroquinone and catechol.

Other objects and embodiments of this invention will be found in the following further detailed description thereof.

It is hereinbefore set forth that the present invention is concerned with a process for introducing hydroxyl substituents on the ring of an aromatic compound, said hydroxylation being effected by treating an aromatic compound with hydrogen peroxide in the presence of hydrogen cyanide, a salt of hydrogen cyanide, or an organo nitrile compound. The starting materials which may be utilized in the proceess of this invention comprise aromatic hydrocarbons and derivatives thereof. The term "aromatic compound" as used in the present specification and appended claims will refer to these hydrocarbons and derivatives thereof and will include primary, secondary, and tertiary alkyl aromatic hydrocarbons such as toluene, o-xylene, m-xylene, p-xylene, ethylbenzene, cumene (isopropylbenzene), n-propylbenzene, t-butylbenzene, t-pentylbenzene, etc., cyclohexylbenzene, 1-methylnaphthalene, 2-methylnaphthalene, 1 - ethylnaphthalene, 2 - ethylnaphthalene, 1-isopropylnaphthalene, 1 - t - butylnaphthalene, 1,2-dimethylnaphthalene, 1,2-diethylnaphthalene, methylbiphenyl, ethylbiphenyl, etc.; hydroxy-substituted aromatic compounds such as phenol, hydroquinone, catechol, resorcinol, 1-hydroxynaphthalene, 2-hydroxynaphthalene, 1,2 - dihydroxynaphthalene, etc.; alkoxy-substituted aromatic compounds such as anisole, phenetol, n-propoxybenzene, o-methylanisole, m-methylanisole, p-methylanisole, m-ethylanisole, p-ethylanisole, o-methylphenetol, m-methylphenetol, p-methylphenetol, etc.; halo-alkyl aromatic compounds such as o-chlorotoluene, m-chlorotoluene, p-chlorotoluene, o-bromotoluene, m-bromotoluene, p-bromotoluene, o-chloroethylbenzene, m-chloroethylbenzene, p - chloroethylbenzene, o - bromoethylbenzene, m-bromoethylbenzene, p-bromoethylbenzene, 2-chloro-1-methylnaphthalene, 2 - bromo - 1 - methylnaphthalene, 4-chloro-1-methylnaphthalene, 4-bromo - 1 - methylnaphthalene, 2-chloro-1-ethylnaphthalene, 4-bromo - 1 - ethylnaphthalene, etc.; aromatic carbohydrate derivatives of aromatic compounds such as 1,1-diphenyl-1-desoxy-D-glucitol, 1,1 - ditolyl-1-desoxy-D-glucitol, 1,1 - bis-(p-isopropylphenyl)-1-desoxy-D-glucitol, 1,1 - bis-(p-methoxyphenyl)-1-desoxy-D-glucitol, 1,1-bis(p-hydroxyphenyl)-1-desoxy-D-glucitol, the corresponding aromatic derivatives of other hexoses (fructose, sorbose, tagatose, psicose, idose, gulose, talose), glycolaldehyde, trioses, tetraoses, pentoses, etc. It is to be understood that the aforementioned compounds are only representative of the type of aromatic hydrocarbons and derivatives thereof which may be utilized as starting materials in the hydroxylation process of the present invention and that said invention is not necessarily limited thereto. Utilizable aromatic derivatives may be represented by the following generic formula: $R_mArX_n$ in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl and hydroxyalkyl radicals, X is independently selected from the group consisting of hydrogen, halogen and nitro substituents, and $m$ and $n$ are integers of at least one.

It is also contemplated within the scope of this invention that heterocyclic compounds such as a quinoline may be treated with hydrogen peroxide in the presence of hydrogen fluoride according to the process of this invention. While the aforementioned list of compounds discloses the presence of primary, secondary, and tertiary alkylated aromatic hydrocarbons as well as hydroxy and alkoxy substituted aromatic compounds, it has been found that unalkylated benzene derivatives including benzene, halobenzenes such as chlorobenzene, bromobenzene, etc., nitrobenzenes, etc., will usually react less substantially than the corresponding alkylated or hydroxylated derivatives and will yield a difficultly separatable mixture of polyhydroxy aromatic compounds and other derivatives thereof.

The process of this invention is effected by treating an aromatic compound of the type hereinbefore set forth in greater detail with hydrogen peroxide in the presence of a coreactant comprising hydrogen cyanide, a salt of hydrogen cyanide or an organic nitrile. The hydrogen peroxide may be present in an aqueous solution containing from about 5% up to about 90% or more hydrogen peroxide. The preferably hydrogen peroxide solution will contain from about 30% to about 50% or higher concentration of hydrogen peroxide inasmuch as when utilizing a lesser amount, the aqueous portion of the solution will tend to make product separation and purification more difficult. The hydroxylation conditions under which the present process is effected will include temperatures ranging from about −10° C. up to about 100° C. or more and preferably in a range from about ambient (25° C.) to about 75° C. The reaction pressure which is utilized will preferably comprise atmospheric although sometimes higher pressure up to about 50 atmospheres may be used, the pressure being that which is necessary to maintain a substantial portion of the reactants in the liquid phase, said superatmospheric pressures being provided for by the introduction of a substantially inert gas such as nitrogen into the reaction zone.

Examples of reactive compositions of matter which may be used to effect the hydroxylation of the aromatic compound comprise hydrogen cyanide, a salt of hydrogen cyanide, or an organo nitrile compound. Specific examples of these salts of hydrogen cyanide include the alkali metal and alkaline earth metal salts such as sodium cyanide, potassium cyanide, lithium cyanide, calcium cyanide, magnesium cyanide, etc., while specific examples of organo nitrile compounds will include benzonitrile, o-tolunitrile, m-toluntrile, p-toluntrile, o-ethylbenzonitrile, m-ethylbenzonitrile, p-ethylbenzonitrile, etc.; acetonitrile, propionitrile, butyronitrile, pentanonitrile, capronitrile, heptanonitrile, caprylnitrile, etc. It is to be understood that the aforementioned organo nitrile compounds are only representative of the class of compounds which may be used as catalysts, and that the present invention is not necessarily limited thereto.

The obtention of either mono-hydroxylated aromatic compounds or polyhydroxylated aromatic compounds can be varied according to the amount of aromatic compound which is treated with the hydrogen peroxide. For example, if a mono-hydroxylated aromatic compound is desired, an excess of this reactant, namely, the aromatic compound, will be used. Conversely speaking, if the polyhydroxylated aromatic compound is to be the desired product, the relative amount of hydrogen peroxide which is used will be increased. Generally speaking, the aromatic compound will be present in a mole ratio in the range of from about 3:1 to about 15:1 moles of aromatic compound per mole of hydrogen peroxide, although greater or lesser amounts of aromatic compounds may also be used, depending, as hereinbefore set forth, as to whether the desired product is to be mono-hydroxylated or polyhydroxylated.

The process of the present invention which comprises preparation of a hydroxylated aromatic compound may be effected in either a batch or continuous type operation. For example, when a batch type operation is used, a quantity of the aromatic compound is placed in an appropriate apparatus such as a flask or stirred autoclave along with the co-reactant comprising the hydrogen cyanide, a salt of hydrogen cyanide, or an organo nitrile compound, the preferred co-reactant comprising the salt of hydrogen cyanide or the organo nitrile compound due to the relatively easier and safer methods which are employed when using this type of co-reactant rather than the extreme precautions which must be observed when using hydrogen cyanide as the reactive composition of matter. The hydrogen peroxide is added thereto, usually dropwise, while maintaining the apparatus at the proper operation conditions of temperature and pressure. Upon completion of the addition of the hydrogen peroxide reactant, the reaction is allowed to proceed for a predetermined residence time, said residence time varying from about 0.5 hours up to about 5 hours or more in duration. Upon completion of the desired residence time, the reaction product is recovered, and subjected to conventional means of separation and recovery, said means include washing the product with an inert organic solvent, flashing off this solvent and subjecting the reaction product to fractional distillation to recover the desired hydroxylated aromatic compound.

It is also contemplated within the scope of this invention that the process for obtaining a hydroxylated aromatic compound may be effected in a continuous manner of operation. When such a type of operation is used, the aromatic compound which is to undergo hydroxylation and the co-reactant of the type hereinbefore set forth are continuously charged to a reaction zone which is maintained at the proper operation conditions of temperature and pressure. In addition, the hydrogen peroxide in the form of an aqueous solution containing from 5% up to about 90% or more hydrogen peroxide is continuously charged to the reaction zone in a slow and deliberate manner. The reaction is allowed to proceed for a predetermined residence time, following which the reactor effluent is continuously withdrawn. The reaction product is separated from the unreacted aromatic compound by conventional means of the type hereinbefore set forth and passed to storage, while the unreacted aromatic compound may be recycled to form a portion of the feed stock.

Examples of hydroxylated aromatic compounds which may be prepared according to the process of this invention include o-hydroxytoluene (o-cresol), p-hydroxytoluene (p-cresol), 2-hydroxy-p-xylene, 4-hydroxy-o-xylene, 2-hydroxyethylbenzene (o-ethylphenol), 2,4-dihydroxyethylbenzene, 2-hydroxy-p-cymene, 2-hydroxy-1-methylnaphthalene, 2,4-dihydroxy-1-methylnaphthalene, 1-hydroxy-2-methylnaphthalene, 1,4-dihydroxy-2-methylnaphthalene, 2-hydroxy-1-methylanthracene, 2,4-dihydroxy-1-methylanthracene, catechol, hydroquinone, hydroxyhydroquinone, pyrogallol, guaiacol, 2-hydroxyphenetol, 2,3-dihydroxyanisole, 2,4-dihydroxyphenetol, 2-hydroxy-p-methylanisole, 2-hydroxy-p-ethylanisole, 2-hydroxy-o-chlorotoluene, 2-hydroxy-o-bromotoluene, 4-hydroxy-o-chlorotoluene, 4-hydroxy-o-bromotoluene, 5-hydroxy-o-chlorotoluene, 5-hydroxy-o-bromotoluene, 1,1-di-(p - hydroxyphenyl) - 1 - desoxy-D-glucitol, 1,1-di(p-hydroxyphenyl)-1-desoxy-D-mannitol, etc. It is to be understood that the aforementioned compounds are only representative of the class of hydroxylated aromatic compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example a solution of 40 cc. of methyl alcohol, 14.1 grams (0.15 mole) of phenol and 15.45 grams (0.15 mole) of benzonitrile was placed in a flask provided with water bath heating means. The solution was heated to a temperature of 60° C. and maintained thereat with stirring while 6.8 grams (0.10 mole) of a 50% hydrogen peroxide solution was added dropwise over a period of about 0.5 hour. At the end of this time, the solution was cooled to room temperature and admixed for an additional contact time.

At the end of this time, the reaction product was recovered and subjected to analysis by means of an A.C. current polarography apparatus, said analysis disclosing the presence of catechol and hydroquinone.

EXAMPLE II

In this experiment 16.2 grams (0.15 mole) of anisole and 15.45 grams (0.15 mole) of benzonitrile are placed in an appropriate flask along with 50 cc. of methyl alcohol. The apparatus is heated to a temperature of about 60° C. while 6.8 grams (0.1 mole) of a 50% solution of hydrogen peroxide is slowly added dropwise during a period of 0.5 hour. Upon completion of the addition of the hydrogen peroxide, the apparatus is then cooled to room temperature and maintained thereat for an additional period of 2 hours. At the end of this time, the reaction product is recovered from the vessel, the reaction mixture is separated from the catalyst and subjected to fractional distillation under reduced pressure. Analysis of the product will disclose the presence of o-methoxyphenol and p-methoxyphenol.

EXAMPLE III

In this experiment 53 grams (0.5 mole) of ethylbenzene along with 35 grams (0.5 mole) of butyronitrile is placed in an apparatus provided with heating and stirring means. In addition, the apparatus will also contain 50 cc. of methyl alcohol, the apparatus then being heated to a temperature of about 60° C. and maintained thereat while 6.8 grams (0.1 mole) of hydrogen peroxide is slowly added thereto. After addition of the hydrogen peroxide, which is accomplished during a period of 0.5 hour, heating is discontinued and the apparatus is allowed to return to room temperature. The mixture is allowed to remain for an additional two-hour contact time while constantly stirring said reaction mixture. At the end of this time, the reaction mixture is recovered and the product separated from the catalyst by conventional means. Analysis of the product by infra-red apparatus will disclose the presence of ethylphenols, ethylcatechols, and ethylhydroquinone.

EXAMPLE IV

To a mixture of 106 grams (1.0 mole) of meta-xylene, 55 grams (1.0 mole) of propionitrile and 100 cc. of ethyl alcohol is added 13.6 grams (0.2 mole) of a 50% hydrogen peroxide solution, addition of the hydrogen peroxide being effected dropwise over a period of 0.5 hour. The apparatus is maintained at a temperature of about 60° C. during the addition of the hydrogen peroxide while constantly stirring the mixture. At the end of the addition time, heating is discontinued and the mixture stirred for an additional period of 2 hours. Following this, the reaction mixture is recovered, separated from the catalyst and subjected to infra-red analysis. This analysis will disclose the presence of 2,4-xylenol and 2,6-xylenol.

EXAMPLE V

In this example 90 grams (1.0 mole) of toluene along with 103 grams (1.0 mole) of benzonitrile and 100 cc. of methyl alcohol is placed in an apparatus provided with heating and stirring means. Following this, 13.6 grams (0.2 mole) of hydrogen peroxide is added thereto over a period of 0.5 hour while maintaining the temperature of the reaction at about 50° C. Upon completion of the addition of the hydrogen peroxide, heating is discontinued and the reactor is allowed to return to room temperature while maintaining the solution in an agitated state for an additional period of 2 hours. Following this, the reaction mixture is recovered and the product is separated from the co-product. Analysis by means of infra-red will disclose the presence of a mixture of cresols.

I claim as my invention:

1. A process for the nuclear hydroxylation of an aromatic compound having the formula $R_mArX_n$ in which Ar is a monocyclic or polycyclic hydrocarbon nucleus, R is selected from the group consisting of n-alkyl, sec-alkyl, tert-alkyl, cycloalkyl, hydroxyl, alkoxyl and hydroxyalkyl radicals, X is independently selected from the group consisting of hydrogen, halogen and nitro substituents, and $m$ and $n$ are integers of at least one, the total of $m$ and $n$ being a maximum of 5, which process comprises treating said aromatic compound with an aqueous hydrogen peroxide solution containing from about 5% to about 90% hydrogen peroxide at a temperature in the range of from about $-10°$ to about $100°$ C. and a pressure in the range of from about atmospheric to about 50 atmospheres sufficient to maintain a substantial portion of the reactants in a liquid phase, the mole ratio of said aromatic compound to hydrogen peroxide being in a range of from about 3:1 to 15:1, in the presence of a co-reactant comprising either hydrogen cyanide, an alkali or alkaline earth metal salt of hydrocyanic acid or a nitrile selected from the group consisting of alkylnitriles, phenylnitrile and an alkylphenylnitrile, and recovering the resultant hydroxylated aromatic compound.

2. The process as set forth in claim 1 in which said nitrile is benzonitrile.

3. The process as set forth in claim 1 in which said nitrile is butyronitrile.

4. The process as set forth in claim 1 in which said nitrile is propionitrile.

5. The process as set forth in claim 1 in which said aromatic compound is phenol and said hydroxylated aromatic compound comprises a mixture of hydroquinone and catechol.

6. The process as set forth in claim 1 in which said aromatic compound is toluene and said hydroxylated aromatic compound comprises a mixture of cresols.

7. The process as set forth in claim 1 in which said aromatic compound is anisole and said hydroxylated aromatic compound comprises a mixture of o-methoxyphenol and p-methoxyphenol.

8. The process as set forth in claim 1 in which said aromatic compound is m-xylene and said hydroxylated aromatic compound comprises a mixture of 2,4-xylenol and 2,6-xylenol.

9. The process as set forth in claim 1 in which said aromatic compound is ethylbenzene and said hydroxylated aromatic compound comprises a mixture of ethylphenols, ethylcatechols and ethylhydroquinone.

References Cited

UNITED STATES PATENTS 3,407,237    10/1968    Vesely _____ 260—621G

FOREIGN PATENTS 1,501,092    10/1967    France _____ 260—621G

OTHER REFERENCES

Kovacic et al., Jour. Amer. Chem. Soc. vol. 87 (1965) 1566–1572.

BERNARD HELFIN, Primary Examiner

U.S. Cl. X.R.

260—621G, 624R, 625, 622R, 623R, 620